(12) United States Patent
Parrenin

(10) Patent No.: US 10,766,152 B2
(45) Date of Patent: Sep. 8, 2020

(54) GLOVE OR BAG WINDER DESIGNED TO BE USED WITH A CLOSED CHAMBER GLOVE BOX

(71) Applicant: COMMISSARIAT A L'ENERGIE ATOMIQUE ET AUX ENERGIES ALTERNATIVES, Paris (FR)

(72) Inventor: Cedric Parrenin, Til-Chatel (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 373 days.

(21) Appl. No.: 15/634,564

(22) Filed: Jun. 27, 2017

(65) Prior Publication Data
US 2018/0009119 A1    Jan. 11, 2018

(30) Foreign Application Priority Data
Jul. 5, 2016 (FR) ..................... 16 56398

(51) Int. Cl.
*B25J 21/02* (2006.01)
*G21F 7/04* (2006.01)
*G21F 7/047* (2006.01)
*G21F 7/053* (2006.01)

(52) U.S. Cl.
CPC ............ *B25J 21/02* (2013.01); *G21F 7/04* (2013.01); *G21F 7/047* (2013.01); *G21F 7/053* (2013.01)

(58) Field of Classification Search
CPC .......... B25J 21/02; G21F 7/047; G21F 7/053; G21F 7/04
See application file for complete search history.

(56) References Cited

U.S. PATENT DOCUMENTS 3,237,821 A * 3/1966 Everett ............... A47G 25/904 223/111
8,240,784 B2 * 8/2012 Hebuterne ............. B25J 21/02 2/270

FOREIGN PATENT DOCUMENTS

WO    WO 2008/040775 A1    4/2008

OTHER PUBLICATIONS

French Preliminary Search Report dated Apr. 13, 2017 in French Application 16 56398, filed on Jul. 5, 2016 (with English Translation of Categories of cited documents).
U.S. Appl. No. 15/322,180, filed Dec. 27, 2016, Cedric Parrenin.

* cited by examiner

*Primary Examiner* — William A. Rivera
(74) *Attorney, Agent, or Firm* — Oblon, McClelland, Maier & Neustadt, L.L.P.

(57) ABSTRACT

A winder includes an attachment to an external portion of a glove port fitted on a closed vacuum chamber, to roll a glove or a bag carried by the glove port outside the chamber.

7 Claims, 3 Drawing Sheets

GLOVE OR BAG WINDER DESIGNED TO BE USED WITH A CLOSED CHAMBER GLOVE BOX

TECHNICAL DOMAIN

The invention relates to glove ports fitted on a glove box type chamber used particularly for the manipulation of radioactive material. Such a box includes a body supporting transparent panels in which openings are formed into which glove ports fit and to which gloves are fixed. It forms a closed chamber that is depressurised, and that an operator can use with the gloves to manipulate elements present in the glove box while remaining outside this glove box.

STATE OF PRIOR ART

As shown on FIGS. 1 and 2, such a glove port 1 comprises a body of revolution 2 engaged in a corresponding hole formed in a panel 3 of the box while remaining fixed to this hole, and that comprises a central opening.

The body of revolution 2 constitutes a sort of bushing that has an internal portion located in the chamber that delimits the box, and an external portion that projects beyond the panel 3 to extend outside the box.

As shown on FIG. 3, a glove 4 made of an elastomer or similar material is fixed at its base to the external portion of the body 2, and it passes through this glove port to extend largely in the chamber into which it is naturally sucked when there is a vacuum in the chamber.

In practice, the glove port 1 comprises a closing disk 6 that closes off its central opening. When the operator has finished his manipulation, he uses the glove to grip the closing disk that remained in the box and puts it into place in the central opening to hermetically close it. At this stage, the glove is entirely located outside the box and hangs vertically from its base fixed to the outside portion of the glove port. When the operator wants to make a new manipulation, he or she slides a hand into the end of the glove, pulls the closing disk out to put it down in the box by engaging the glove through the opening so as to be able to perform the required operations.

When the glove port does not have a closing disk, the operator takes out the gloves that he or she uses and ties them together outside the box so that they are not drawn in by the negative pressure inside this box.

Similarly, such a glove port can support a vinyl bag 7 instead of a glove, as shown on FIGS. 5 and 6, this bag then being used in a similar manner to extract one or more elements contained in the box, from the box. As can be seen on FIG. 4, the element is then placed in the bag outside the box, before this bag is cut and crimped so that the element concerned can be disposed of without bringing the inside of the box into communication with its environment.

When the glove port is fitted with a vinyl bag 7, it is generally impossible to tie this bag on the outside to make it remain outside even though it is being sucked inwards as illustrated on FIG. 5. In particular, this means that the bag is continuously tensioned, which accelerates its degradation, which means that it would have to be replaced earlier, thus producing unwanted waste.

PRESENTATION OF THE INVENTION

To achieve this, the purpose of the invention is a winder comprising a roller and means of attachment to an external portion of a glove port fitted on a closed vacuum chamber or a panel in which this glove port is fitted, to roll a glove or a bag carried by this glove port outside this chamber.

The invention thus makes it possible to roll a glove or a bag projecting outside the glove box in which it is fitted and to fix the winder to this glove port for the entire period during which the bag or the glove is not used.

The invention also applies to a winder as defined above, comprising a roller carried by a spindle and in which the attachment means are formed by two attachment cleats by tightening of the external portion of the glove port, one end of the spindle passing through each cleat pressed in contact with one end of the roller by a nut screwed to an end of the spindle.

The invention also relates to a winder as defined above, in which one of the cleats is rigidly fixed to one end of the spindle.

The invention also relates to a winder as defined above, in which one of the nuts is a butterfly nut.

The invention also relates to a winder thus defined, in which the rotary roller comprises a blocking slit into which one end of a glove or bag fits before winding.

The invention also relates to a winder thus defined, comprising an arm that folds down along the roller to clamp one end of a glove or a bag in contact with this roller so that it is blocked in place before winding.

The invention also relates to a winder thus defined, in which the attachment means are provided with roller reception devices by click fitting.

The invention also relates to a winder thus defined, in which the attachment means are arranged to be permanently fixed to the glove port or to a panel on which this glove port is fixed.

The invention also relates to a glove port equipped with a roller as defined above.

DETAILED PRESENTATION OF PARTICULAR EMBODIMENTS

The basic concept of the invention is to avoid a bag or a glove being sucked in under the effect of suction when this bag or this glove is not in use, when the glove port to which it is fixed does not have a closing disk.

Figure 1:
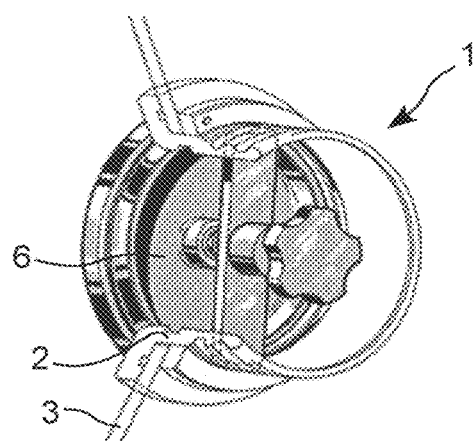
FIG. 1 already described shows an external view of a glove port with a closing disk.
Figure 2:
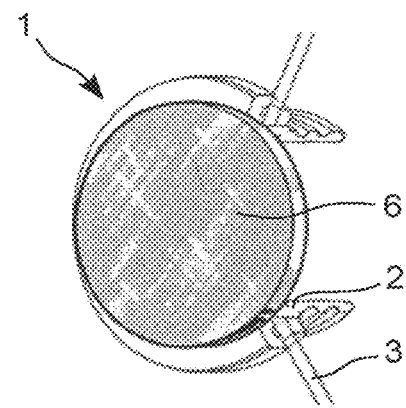
FIG. 2 already described shows an internal view of a glove port with a closing disk.
Figure 3:
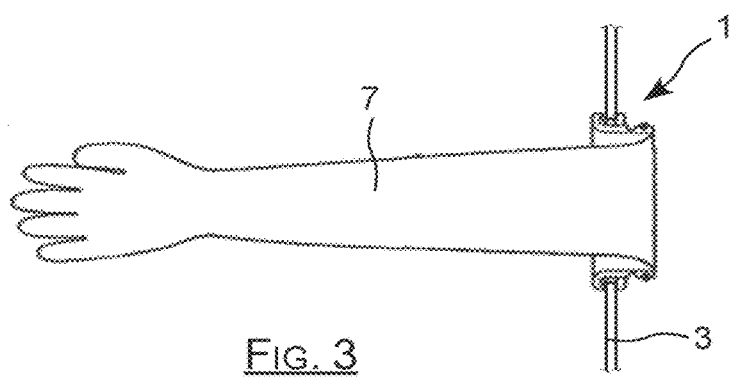
FIG. 3 already described shows a lateral view of a glove that is sucked inside a glove box.
Figure 4:
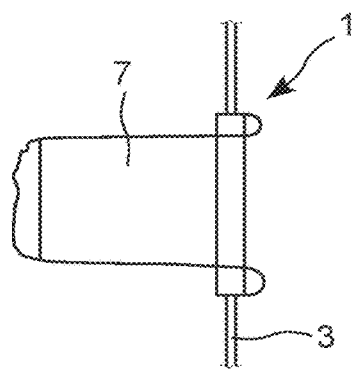
FIG. 4 already described shows a lateral view of a bag that is carried by a glove port and is sucked inside a glove box.
Figure 5:
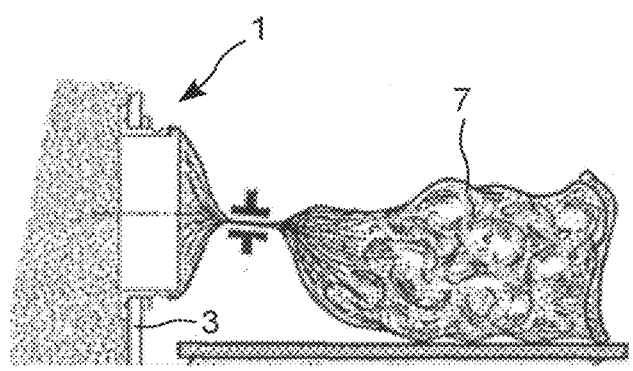
FIG. 5 already described shows a lateral view of a bag located outside the box and enclosing an element to be extracted from this box.
Figure 6:
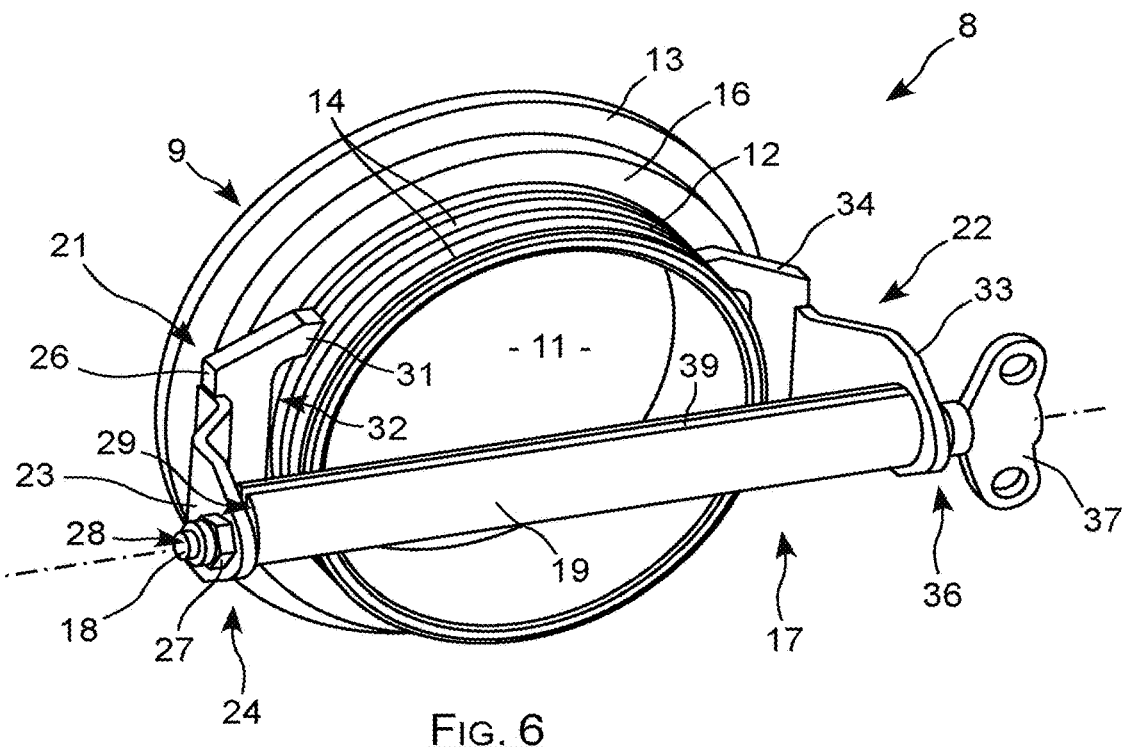
FIG. 6 is a perspective view of a glove port fitted with a winder according to the invention.

The glove port 8 in FIG. 6 comprises a body 9 that has a shape of revolution corresponding to the shape of a bushing delimiting a circular central opening 11. This body 9 comprises an internal portion 13 and an external portion 12 in which several external circumferential grooves 14 are formed, this body 9 being engaged in a circular opening in a panel not shown.

The body 9 is held to the panel by a ring 16 that surrounds its external portion 12 to tighten this panel in contact between this ring 16 and the internal portion 13 of the body 9.

The winder according to the invention that is marked 17 on FIG. 6 comprises a spindle 18 on which a roller 19 is mounted extending over most of the length of this spindle 18, and two attachment pads 21, 22 each fixed to one end of this spindle 18.

As can be seen on FIG. 6, the general shape of the cleat 21 is a plate globally folded at a right angle. It comprises a drilled end 23 by which it is fixed to a first end 24 of the assembly composed of the spindle 18 carrying the roller 19, and a clamping end 26 bearing in contact with a groove 14 in the external portion of the body 9 when the winder is installed.

The drilled end 23 of the cleat 21 is tightened between a nut 27 screwed to a first end 28 of the spindle 18 and a first end 29 of the roller 19. The spindle 18 and the roller 19 extend along a direction AX, and the drilled end 23 extends in a plane normal to this direction AX when the winder is tight.

The tightening end 26 extends parallel to the AX axis, in other words perpendicular to the drilled end 23. This tightening end 26 is terminated by two layers, one of which can be seen on FIG. 6 in which it is denoted 31, that are at a distance from each other and separated by a recess 32 so that each of them can bear in one of the grooves 14 when the winder is installed.

The second cleat 22 is identical to the first cleat 21, and it also has a drilled end denoted 33, and a tightening end denoted 34, and projects at a right angle from the drilled end 33.

The second cleat 22 is fixed to the second end 36 of the assembly composed of the roller 19 and its spindle 18 with the opposite end of the spindle 18 passing through it, being pushed into contact with the second end of the roller 19 by a butterfly nut 38 screwed to the second end of the spindle 18.

In general, the tightening ends 26 and 34 of the two cleats 21 and 22 jointly form the jaws of a clip or a clamp tightening on the groove around the periphery of the external portion 12. They are tightened and untightened by manually tightening and untightening the butterfly nut 37.

In the example in the figures, each cleat is composed of two elements that are fixed to each other, one corresponding to the tightening end and the other corresponding to the drilled end, but each cleat can also be formed in a single piece of cut, stamped and/or folded plate.

These cleats 21 and 22 may also be designed to carry complementary equipment such as biological protection means against radiation and/or a cover to protect the wound bag against mechanical aggressions.

In practice, the faces of the ends of the roller 19 extend parallel to each other perpendicular to the spindle of this roller 19. Tightening the butterfly nut 37 thus simultaneously forces the drilled ends 23 and 33 of the cleats 21 and 22 respectively into contact with the two ends of the roller 19 to bring the tightening ends 26, 34 of these cleats towards each other, and also to block the roller 19 in rotation. Similarly these cleats can be loosened in a similar manner, by untightening the butterfly nut 37.

Advantageously, the drilled end 23 comprises a thread and the nut 27 is of the self-blocking type such that the first cleat 21 is firmly fixed to the first end 28 of the spindle 18, to simplify manipulation of the winder by an operator.

Figure 7:
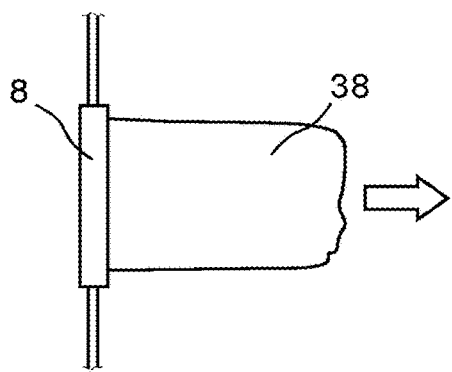
FIG. 7 is a lateral view of a bag extracted outside a glove port.

In practice, once the operator has finished using the vinyl bag carried by such a glove port 8, he firstly extracts this bag 38 outside the chamber through the glove port 8, resisting the vacuum inside the chamber, resulting in a situation like that shown in FIG. 7.

Figure 8:
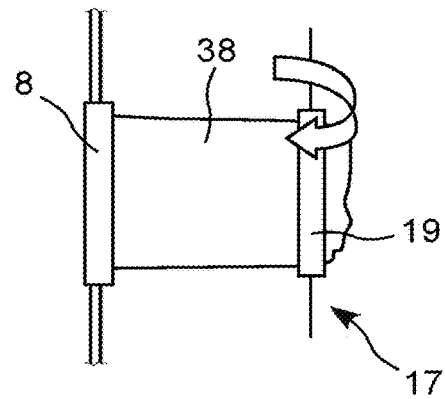
FIG. 8 is a lateral view showing winding of a bag around the winder according to the invention.

He then engages the free end of the bag 38 in a longitudinal slit 39 in the roller 19, and then turns this roller so as to wind the bag from its free end, as shown in FIG. 8. This slit that extends along the roller can be closed or can pass through, and can extend over all or part of the length of the roller 19.

Figure 9:
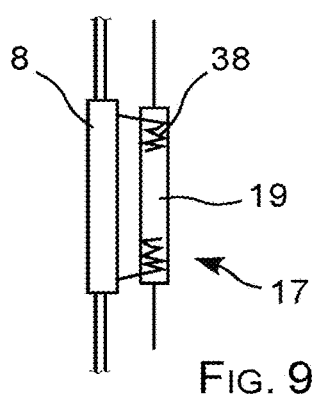
FIG. 9 is a lateral view of a bag fully wound around the winder according to the invention.
Figure 10:
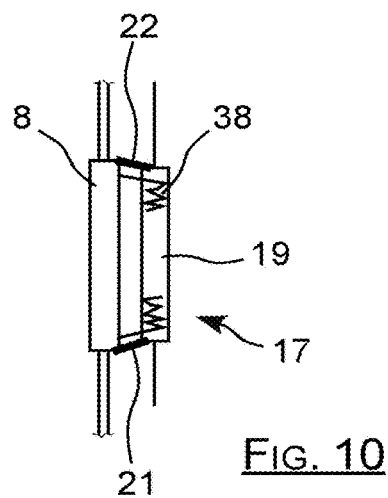
FIG. 10 is a lateral view of a bag wound around the winder according to the invention that is fixed to the glove port.

The operator thus winds the bag 38 until it is close to its base that is fixed to the body 9 of the glove port 8, corresponding to the situation in FIG. 9 in which the roller 19 is located almost in contact with the external portion 12 of the body 9 of the glove port 8.

At this stage, the operator engages the first cleat 21 around the spindle 18, by pressing on the self-locking nut 28 and he engages the remainder of the spindle 18 in the roller 19, and then engages the second cleat 22 and the butterfly nut 37 around the second end of this spindle 18 that projects from the second end of the roller 19.

The operator then places the clamping ends 26 and 34 of the cleats around the external portion 12 and facing one of the circumferential grooves 14, to tighten the butterfly nut 37 so as to tighten these cleats 21 and 22 so that they clamp the external portion 12 of the body 9 to attach to it.

As the operator tightens the butterfly nut 37, firstly he tightens the clamping ends of the cleats 21 and 22 to fix the winder to the glove port 8, and secondly he blocks the roller 19 in rotation, since the roller is under pressure between the cleats 21 and 22 that bear on its ends.

The bag 38 can also be wound around the roller 19 equipped with the spindle 18 and cleats 21 and 22 assembly, the butterfly nut 37 then being loose, to then place the cleats on the groove 14 before tightening the butterfly nut to jointly fix the winder and block its roller.

As will be understood, the example in FIGS. 7 to 10 is given for the case of a vinyl bag 38 wound around the roller 19, but the procedure is exactly the same for the case of a glove.

Moreover, in the example in FIG. 6, the roller 19 comprises a longitudinal slit in which the end of the bag or the glove is engaged to block it. But other blocking systems can be envisaged, as illustrated for example in FIG. 11. In this other example embodiment of the invention, the roller 19 carries a folding arm 41 that clamps the end of the glove or bag 38 in contact with the roller to block it.

Figure 11:
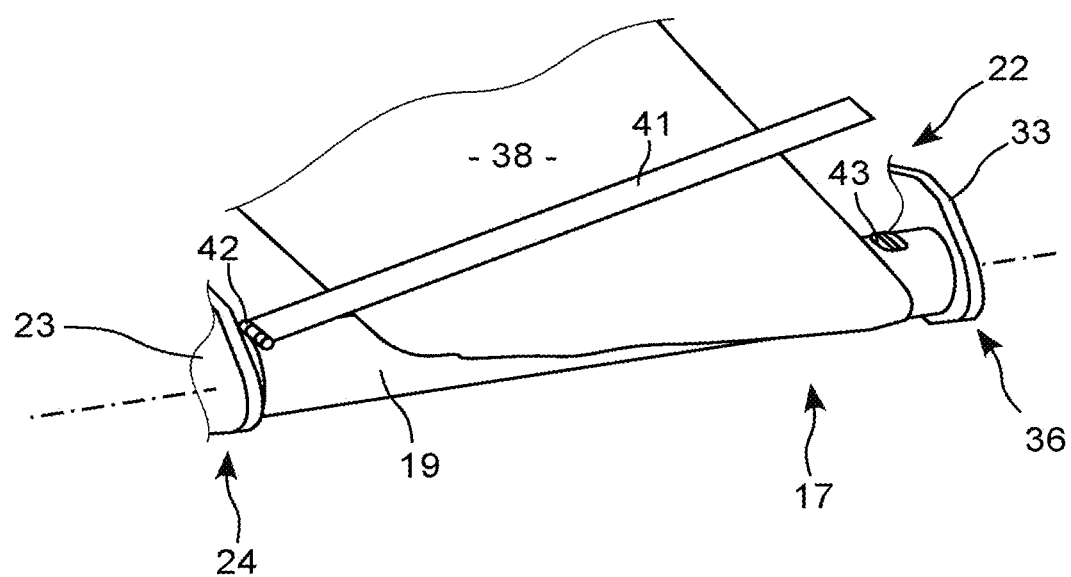
FIG. 11 is a perspective view partially showing a variant embodiment of the device according to the invention.

In the example in FIG. 11, the shape of this arm 41 is generally straight and its length is significantly less than the length of the roller 19. One of the ends of this arm 41 is fixed to one end 24 of the roller 19 by an articulation 42 with axis normal to the axis of the roller, and a fastener 43 is provided at the opposite end of this arm 41, to hold the arm 41 fixed in contact with the roller 19 and along it such that it clamps the end of the bag 38.

Thus, once the end of the bag 38 is blocked by being clamped between the arm 41 and the roller 19, the operator winds this bag around the roller 19 and then proceeds as described above.

In the example in the figures, the winder according to the invention comprises a roller that is fixed to the attachment cleats before the assembly is fixed to the glove port. The attachment cleats can also be permanently fixed to the glove port, or to the panel supporting this glove port, on each side of the panel, for example by gluing. In this case, the roller can be moved relative to the cleats, and the user winds the glove or the bag around the roller, before positioning the roller between the cleats to fix them to it, for example by click fitting so that they hold it in place.

In general, the invention makes it possible to wind an unused bag or glove so that it will not be sucked into the chamber, or it can hang outside the chamber when the glove port to which it is fixed is equipped with a closing disk.

The invention is easily adapted to different glove port diameters, that are usually between one hundred and fifty and five hundred millimetres, and it has the advantage that it can be adapted to standard glove port models.

The invention is applicable to different types of chambers in which a vacuum is formed, that are generally used in the nuclear and chemical industries, and also in biology and hospital applications.

The invention claimed is:

1. A winder comprising:
    a roller with an attachment to an external portion of a glove port fitted on a closed vacuum chamber or a panel, wherein said glove port is fitted, to roll a glove or a bag carried by said glove port outside said chamber,
    wherein the roller is carried by a spindle, and
    wherein the attachment is formed by two attachment cleats by tightening of the external portion of the glove port, one end of the spindle passing through each cleat pressed in contact with one end of the roller by a nut screwed to an end of the spindle.

2. The winder according to claim 1, wherein one of the cleats is rigidly fixed to one end of the spindle.

3. The winder according to claim 1, wherein one of the nuts is a butterfly nut.

4. The winder according to claim 1, wherein the roller comprises a blocking slit into which one end of a glove or bag fits before winding.

5. The winder according to claim 1, comprising an arm that folds down along the roller to clamp one end of a glove or a bag in contact with said roller so that it is blocked in place before winding.

6. The winder according to claim 1, wherein the attachment is arranged to be permanently fixed to the glove port or to a panel on which said glove port is fixed.

7. A glove port that will be fitted on a glove box panel delimiting a closed chamber, to be fitted with a glove for the manipulation of elements in the chamber or a bag to extract elements from said chamber, said glove port being fitted with a winder according to claim 1.

* * * * *